United States Patent
Chou et al.

(10) Patent No.: US 11,707,951 B2
(45) Date of Patent: Jul. 25, 2023

(54) WIRELESS PROGRAMMING METHOD FOR TIRE PRESSURE DETECTORS

(71) Applicant: MOBILETRON ELECTRONICS CO., LTD., Taichung (TW)

(72) Inventors: Ming-Hui Chou, Taichung (TW); Wen-Chuan Hung, Taichung (TW)

(73) Assignee: Mobiletron Electronics Co., Ltd., Taichung (TW)

( * ) Notice: Subject to any disclaimer, the term of this patent is extended or adjusted under 35 U.S.C. 154(b) by 113 days.

(21) Appl. No.: 17/236,699

(22) Filed: Apr. 21, 2021

(65) Prior Publication Data
US 2021/0331533 A1    Oct. 28, 2021

(30) Foreign Application Priority Data
Apr. 27, 2020   (TW) .................................. 109114034

(51) Int. Cl.
*B60C 23/04*      (2006.01)
(52) U.S. Cl.
CPC ...... *B60C 23/0479* (2013.01); *B60C 23/0455* (2013.01)
(58) Field of Classification Search
CPC ........................ B60C 23/0479; B60C 23/0455
USPC ........................................................ 340/447
See application file for complete search history.

(56) References Cited

U.S. PATENT DOCUMENTS

| | | | | |
|---|---|---|---|---|
| 9,120,357 B2 * | 9/2015 | Deniau | | B60C 23/0471 |
| 2008/0117036 A1 * | 5/2008 | Kenny | | H04Q 9/00 |
| | | | | 340/447 |
| 2009/0058626 A1 * | 3/2009 | Watabe | | B60C 23/045 |
| | | | | 340/447 |
| 2012/0232753 A1 * | 9/2012 | Lhuillier | | B60C 23/0479 |
| | | | | 701/36 |
| 2014/0306815 A1 * | 10/2014 | Henriet | | B60C 23/0479 |
| | | | | 340/447 |
| 2014/0361884 A1 * | 12/2014 | Yu | | B60C 23/0479 |
| | | | | 340/447 |
| 2017/0050476 A1 * | 2/2017 | Liu | | B60C 23/0477 |
| 2017/0225526 A1 * | 8/2017 | Tomakidi | | G07C 9/00309 |

(Continued)

*Primary Examiner* — Kerri L McNally
(74) *Attorney, Agent, or Firm* — Apex Juris, pllc; Hilde Coeckx

(57) ABSTRACT

A wireless programming method for tire pressure detectors includes the following steps. A wireless programmer sends an activating command. The tire pressure detectors send a responding message. The wireless programmer receives the responding messages and records identification codes in the received responding messages. The wireless programmer sends a stop-responding command to make the tire pressure detector with the identification codes, which is recorded in the wireless programmer, enter a stop-responding mode. The wireless programmer sends the activating command again. The tire pressure detectors not in the stop-responding mode send the responding messages. The wireless programmer receives the responding message and records the identification code in the received responding message. The wireless programmer sends a code to the tire pressure detectors corresponding to the recorded identification code to program the code. With such design, it could be ensured that the code could be sent and programmed into all the tire pressure detectors.

12 Claims, 4 Drawing Sheets

(56) References Cited

U.S. PATENT DOCUMENTS

2019/0092105 A1\* 3/2019 Wicher ............... B60C 23/0416
2019/0120721 A1\* 4/2019 Suzuki ................. B60C 11/246

\* cited by examiner

WIRELESS PROGRAMMING METHOD FOR TIRE PRESSURE DETECTORS

BACKGROUND OF THE INVENTION

Technical Field

The present invention relates generally to programming of a tire pressure detector, and more particularly to a wireless programming method for programming a code into multiple tire pressure detectors.

Description of Related Art

For the sake of safety, a tire pressure monitoring system (which is abbreviated as "TPMS") is standard on new cars. The tire pressure monitoring system basically is consisting of tire pressure detectors and a receiver mounted in a car, wherein the tire pressure detectors are mounted on a plurality of wheels for detecting a tire pressure, a tire temperature, and other tire conditions of each one of the wheels. Data of tire conditions could be wirelessly sent to the receiver in the car by the tire pressure detectors to report the tire conditions to a driver in time. Once the tire conditions become abnormal, the driver could be warned in time.

Each of the tire pressure detectors is consisting of a controller and a sensor, wherein the controller runs a code to initiate the sensor to sense the tire pressure, the tire temperature, and the tire conditions. The data of the tire conditions could be wirelessly sent to the receiver in the car. The receiver analyzes the tire pressure, the tire temperature, and the tire conditions to check whether the tires are in a normal condition. An update of the code is done by wired programming or wireless programming.

The wired program is executed when tire pressure detectors are electrically connected to a programmer, so that a transmission of the code is not easily interfered, thereby increasing a correct rate of the code which is programmed into the tire pressure detectors. An error is hard to be found in the code. On the other hands, the wireless program is to transmit the code from a wireless programmer to the tire pressure detectors by a wireless way. It is not necessary to use any cable to connect the wireless programmer and the tire pressure detectors, so that the wireless program is more convenient.

During wireless programming, the programmer sends an activating command, and each of the tire pressure detectors sends the identification code back to the programmer after the tire pressure detector receives the activating command. The programmer then sends the code to the tire pressure detectors corresponding to the identification codes to programming. However, when there are multiple tire pressure detectors, the tire pressure detectors, that receive the activating command sent by the programmer, send the identification codes to the programmer at the same time, the wireless signals may interfere each other, causing the programmer missing the identification codes of a portion of the tire pressure detectors. Therefore, the programmer could not send the code to said portion of the tire pressure detectors to program the code in the portion of the tire pressure detectors.

BRIEF SUMMARY OF THE INVENTION

In view of the above, the primary objective of the present invention is to provide a wireless programming method for tire pressure detectors, which could ensure that the code could be programmed into all of tire pressure detectors, even if multiple tire pressure detectors are programmed at the same time.

The present invention provides a wireless programming method for a tire pressure detector, which is applied in a wireless programmer and a plurality of tire pressure detectors. The wireless programmer communicates with the plurality of tire pressure detectors in a wireless way, and each of the plurality of tire pressure detectors has an identification code. The wireless programming method includes:

A. send an activating command by the wireless programmer.

B. send a responding message by each of the plurality of tire pressure detectors that receives the activating command, wherein the plurality of responding messages respectively includes the identification code of each of the plurality of tire pressure detectors.

C. receive at least one of the plurality of responding messages sent by the plurality of tire pressure detectors by the wireless programmer and record the identification code of the at least one of the plurality of responding messages that is received.

D. send at least one stop-responding command by the wireless programmer, wherein the at least one stop-responding command includes the at least one identification code that is recorded.

E. make at least one of the plurality of tire pressure detectors enter a stop-responding mode when the identification code of the tire pressure detector receiving the at least one stop-responding command is consistent with the identification code in the at least one stop-responding command, wherein the tire pressure detector in the stop-responding mode stops sending the responding message when the tire pressure detector receives the activating command.

F. send the activating command again by the wireless programmer.

G. receive the activating command by the plurality of tire pressure detectors to make the tire pressure detectors, which do not stay in the stop-responding mode, send the responding messages.

H. receive the responding messages by the wireless programmer and record the identification code in each of the responding messages.

I. send a code by the wireless programmer to the plurality of tire pressure detectors having the identification codes that are recorded in the wireless programmer to program the code into the plurality of tire pressure detectors.

The present invention provides another wireless programming method for a tire pressure detector which is applied in a wireless programmer and a plurality of tire pressure detectors, wherein the wireless programmer communicates with the plurality of tire pressure detectors in a wireless way, and each of the plurality of tire pressure detectors has an identification code. The wireless programming method includes:

A. send an activating command by the wireless programmer.

B. send a plurality of responding messages by the plurality of tire pressure detectors, after the plurality of tire pressure detectors receives the activating command, wherein the plurality of responding messages respectively includes the identification code of at least one of the plurality of tire pressure detectors.

C. receive at least one of the plurality of responding messages sent by the plurality of tire pressure detectors by the wireless programmer and record the identification code of the at least one of the plurality of responding messages that is received.

D. send at least one stop-responding command by the wireless programmer, wherein the at least one stop-responding command includes the at least one identification code that is recorded.

E. determine whether the identification code of the at least one tire pressure detector is consistent with the identification code included in the at least one stop-responding command, after the at least one tire pressure detector receives the at least one tire pressure detector. When the identification codes are consistent, the at least one tire pressure detector enters a stop-responding mode.

F. send the activating command again by the wireless programmer.

G. stop sending the responding message by the at least one tire pressure detector which receives the activating command.

H. send a code by the wireless programmer to the at least one tire pressure detector having the identification code recorded in the wireless programmer, thereby programming the code into the at least one tire pressure detector.

Before the wireless programmer sends the activating command again, the responding messages of the portion of the tire pressure detectors are received by the wireless programmer, and the stop-responding command is sent to make the portion of the tire pressure detectors enter the stop-responding mode, so that the number of the tire pressure detectors which send the responding messages is reduced after the second activating command. Therefore, when the wireless programmer receives the responding messages at the second time, the interference between the wireless signals is reduced, thereby allowing the identification codes of all of the tire pressure detectors could be received by the wireless programmer to ensure the code could be sent to and programmed into all of the tire pressure detectors.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
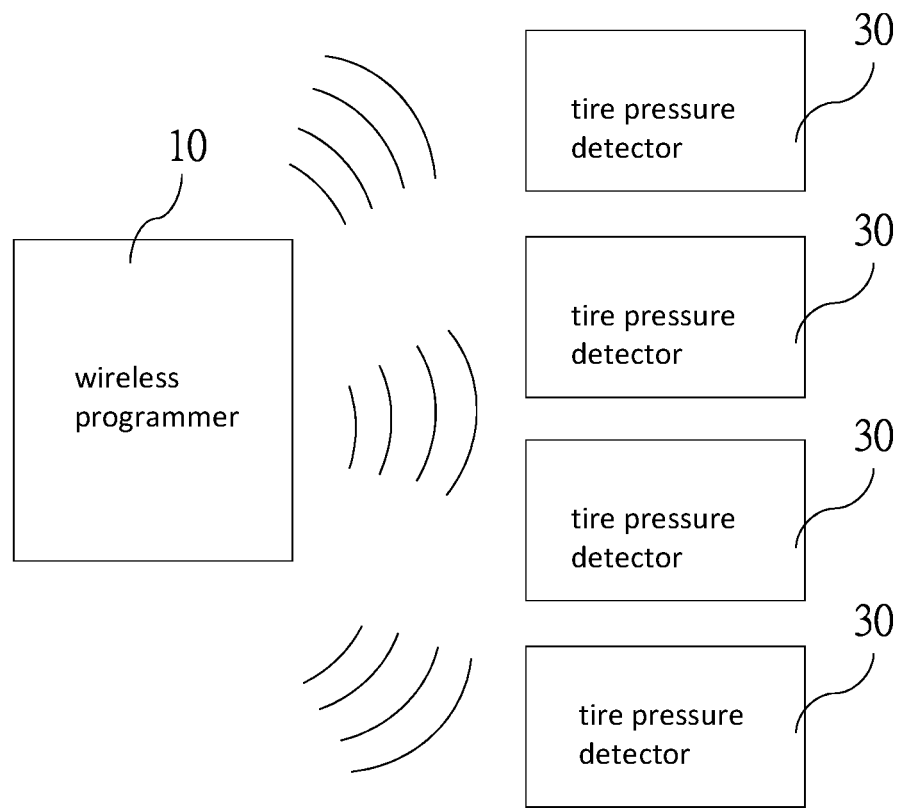
FIG. 1 is a system block diagram of the wireless programming system of an embodiment according to the present invention.
Figure 2:
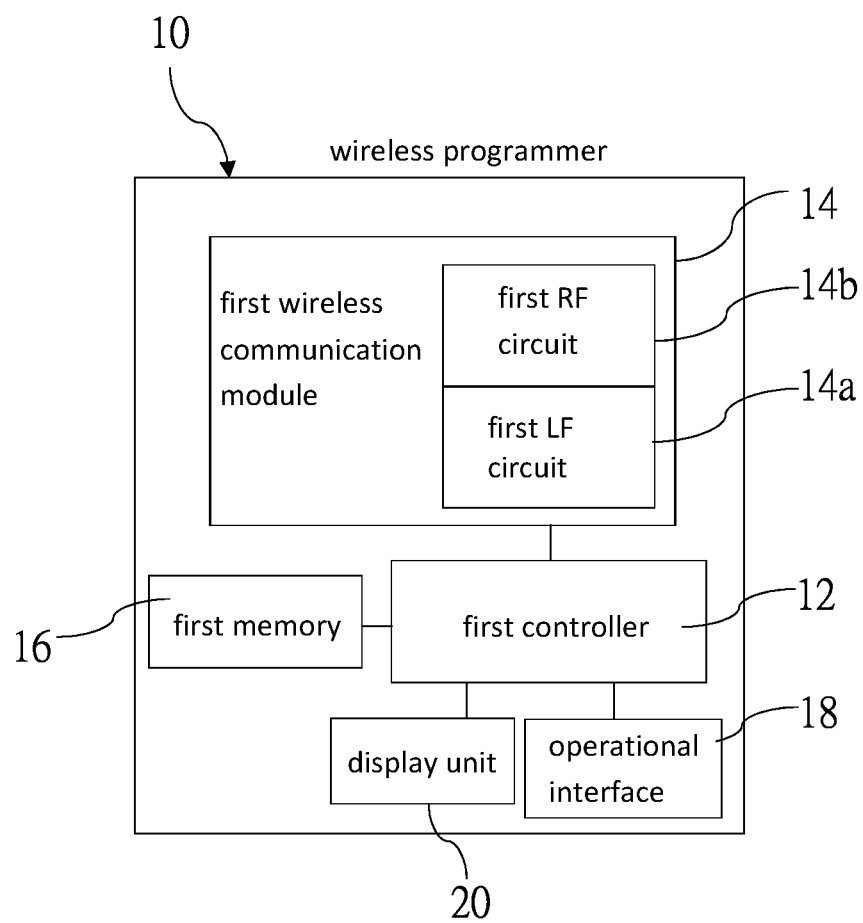
FIG. 2 is a block diagram of the wireless programmer of the embodiment according to the present invention.
Figure 3:
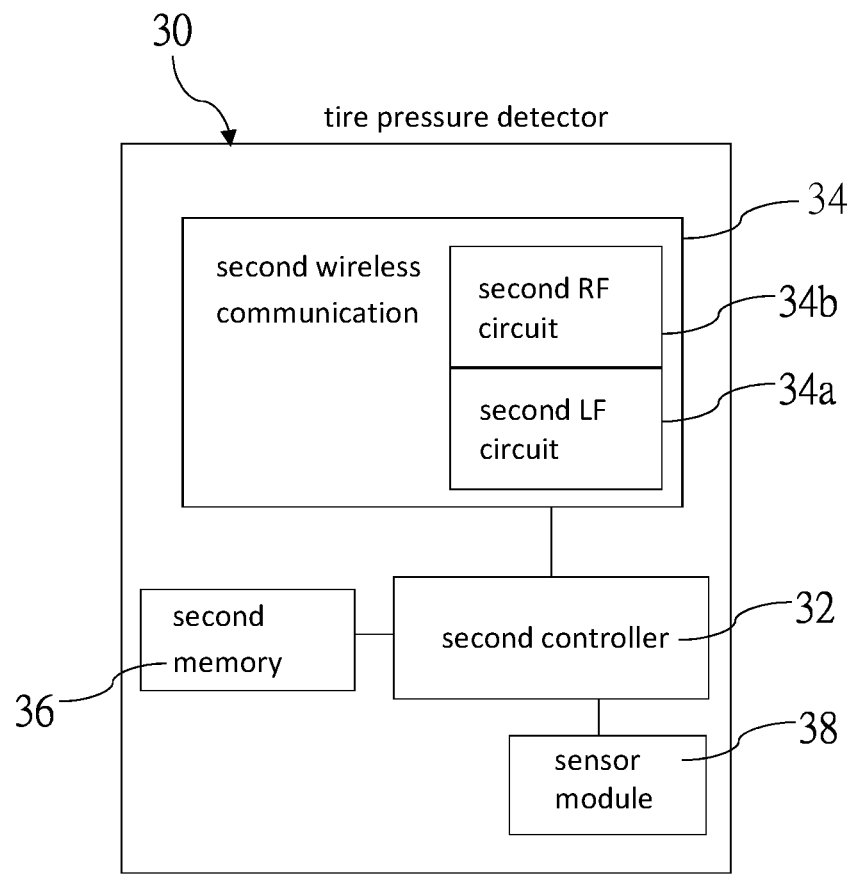
FIG. 3 is a block diagram of the tire pressure detector of the embodiment according to the present invention.

Referring to FIG. 1 to FIG. 3, a wireless programming method for a tire pressure detector of an embodiment according to the present invention which is applied in a wireless programming system, wherein the wireless programming system includes a wireless programmer 10 and a plurality of tire pressure detectors 30.

As illustrated in FIG. 2, the wireless programmer 10 includes a first controller 12, a first wireless communication module 14, a first memory 16, an operational interface 18, and a display unit 20, wherein the first wireless communication module 14, the first memory 16, the operational interface 18 and the display unit 20 are electrically connected to the first controller 12. In the current embodiment, the first controller 12 is a microcontroller unit (MCU). The first wireless communication module 14 is used for communicating with the tire pressure detectors 30. In the current embodiment, the first wireless communication module 14 includes a first low-frequency circuit 14a (which is abbreviated as "first LF circuit" hereinafter) and a first radio-frequency circuit 14b (which is abbreviated as "first RF circuit" hereinafter). A frequency range of the first LF circuit 14a is between 120 kHz and 130 kHz, and a frequency range of the first RF circuit 14b is between 314 MHz to 318 MHz or between 432 MHz to 434 MHz, wherein the first LF circuit 14a and the first RF circuit 14b are adapted to send data to or receive data from the tire pressure detectors 30, but it is not limited to the above. In practice, the programmer 10 could be merely disposed with either the first LF circuit 14a or the first RF circuit 14b for sending or receiving data.

At least one code is stored in the first memory 16. In practice, the first memory 16 could be built in the first controller 12. An operator could learn an operating condition from the display unit 20 by operating operational interface 18.

Since configurations of the tire pressure detectors 30 are the same, one of the tire pressure detectors 30 is taken as an example to describe hereafter. As illustrated in FIG. 3, the tire pressure detector 30 includes a second controller 32, a second wireless communication module 34, a second memory 36, and a sensor module 38, wherein the second wireless communication module 34, the second memory 36, and the sensor module 38 are electronically connected to the second controller 32. In the current embodiment, the second controller 32 is a microcontroller unit (MCU). The second wireless communication module 34 is adapted to communicate with the first wireless communication module 14. In the current embodiment, the second wireless communication module 34 includes a second low-frequency circuit 34a (which is abbreviated as "second LF circuit" hereinafter) and a second radio-frequency circuit 34b (which is abbreviated as "second RF circuit" hereinafter), wherein the second LF circuit 34a communicates with the first LF circuit 14a, and the second RF circuit 34b communicates with the first RF circuit 14b. The second memory 36 is adapted to store an identification code, and a code could also be stored in the second memory 36 as well. In practice, the second memory 36 could be built in the second controller 32. In the current embodiment, the identification code could be, but not limited to, numbers, alphabets, or a combination thereof.

The sensor module 38 at least includes a pressure sensor. In the current embodiment, the sensor module 38 includes the pressure sensor and a temperature sensor, wherein the pressure sensor is adapted to sense a tire pressure of a tire, and the temperature sensor is adapted to sense a tire temperature of the tire.

The second controller 32 runs the code saved in the second memory 36 to initiate the sensor module 38 to sense a tire pressure, a tire temperature, and other tire condition of the tire that is disposed with the tire pressure detectors 30, and then transmits a data of the tire condition of the tire to the wireless programmer 10 or a receiver in the car via the second RF circuit 34b of the second wireless communication module 34.

Figure 4:
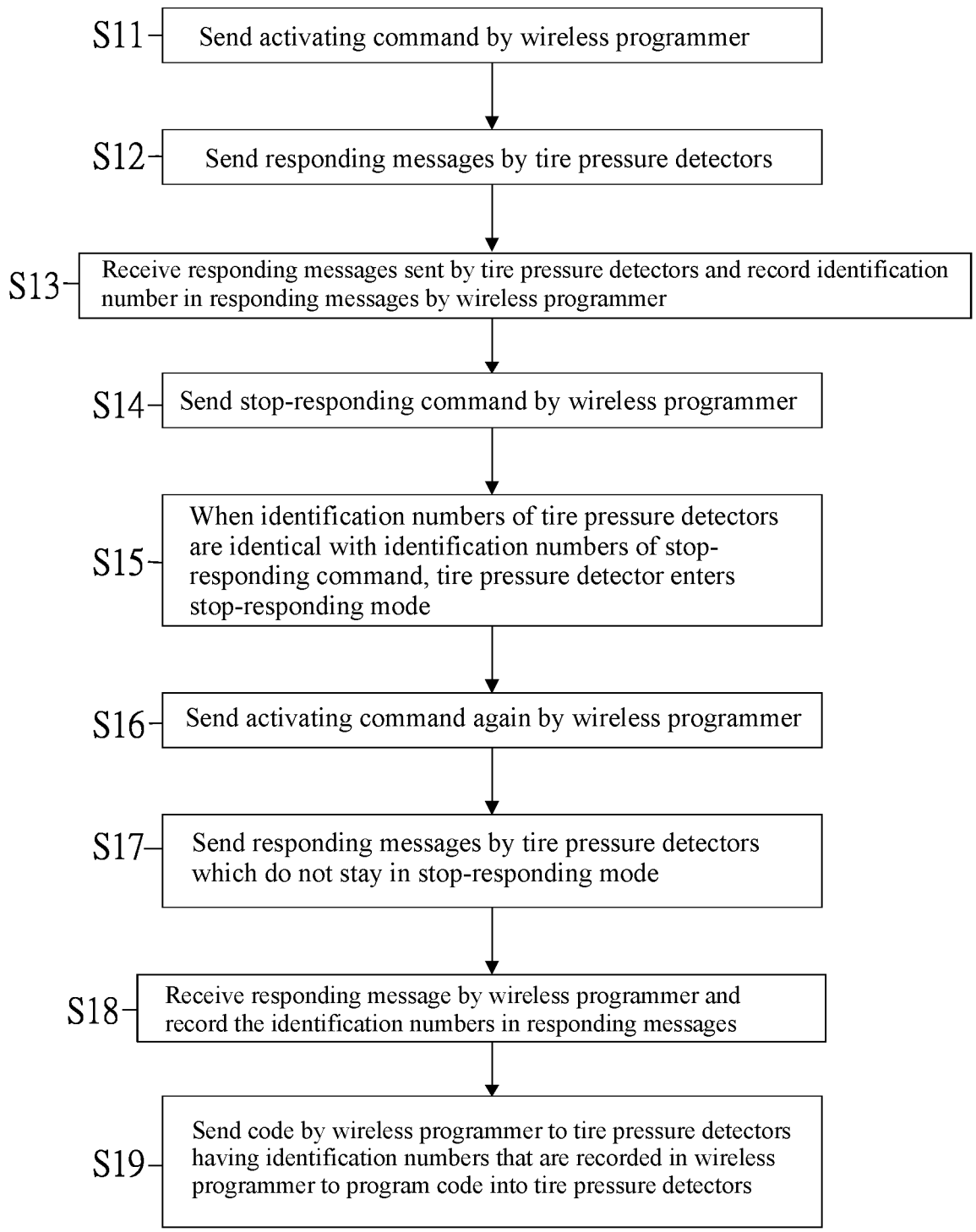
FIG. 4 is a flow chart of the wireless programming method of the tire pressure detector of the embodiment according to the present invention.

Based on the system described above, the wireless programming method of the embodiment according to the present invention could be used in the system, wherein the wireless programming method includes the following steps as shown in FIG. 4:

Step S11: The wireless programmer 10 sends an activating command. In the current embodiment, the first controller 12 transmits the activating command to each of the tire pressure detectors 30 by broadcasting.

Step S12: Each of the tire pressure detectors 30 receiving the activating command sends a responding message, wherein the responding message includes the identification code of the tire pressure detector 30 itself. In the current embodiment, each of the tire pressure detector 30 receives the activating command via the second LF circuit 34a of the second wireless communication module 34 to transmit the activating command to the second controller 32. The second controller 32 accesses the identification code stored in the second memory 36 and sends the responding message with the identification code via the second LF circuit 34a.

Step S13: The wireless programmer 10 receives at least one of the responding messages sent by the tire pressure detectors 30 and records the identification code of the at least one of the responding messages that is received. In the current embodiment, since the tire pressure detectors 30 sends the responding messages almost at the same time, the responding messages may be missed by the first LF circuit 14a of the first wireless communication module 14 of the wireless programmer 10 due to a wireless signal interference between the responding messages. However, the first LF circuit 14a could receive at least one of the responding messages. The first LF circuit 14a sends the at least one of the responding message that is received to the first controller 12. The first controller 12 reads the at least one responding message to obtain the identification code inside and stores the identification code into the first memory 16. In other words, in this step, the at least one of the identification codes of the tire pressure detectors 30 could be recorded in the first memory 16.

Step S14: The wireless programmer 10 sends at least one stop-responding command which includes the identification code recorded in the wireless programmer 10. In the current embodiment, the first controller 12 sends the stop-responding command, including the at least one of the identification codes that is recorded in the step S13, via the first LF circuit 14a.

For example, when a number of the tire pressure detectors 30 is four, in the step S13, the wireless programmer 10 receives the responding messages of two of the tire pressure detectors 30 and miss the responding messages of the other two of the tire pressure detectors 30. In the step 14, the first controller 12 sends the stop-responding command with the identification codes of the two of the tire pressure detectors 30.

In practice, in the step S14, the first controller 12 could successively send at least two stop-responding commands, each of the at least two stop-responding command includes one of the identification codes that are recorded. The identification codes included in the stop-responding commands are different.

Step S15: When the identification code of the tire pressure detector 30 that receives the at least one stop-responding command is consistent with the identification code included in the at least one stop-responding command, the tire pressure detector 30 enters a stop-responding mode. The tire pressure detector 30 in the stop-responding mode stops sending the responding message when the tire pressure detector 30 receives the activating command. In the current embodiment, all of the tire pressure detectors 30 could receive the stop-responding commands. The second controller 32 of each of the tire pressure detector 30 compares the identification code in the stop-responding commands that are received with the identification code stored in the second memory 36 to determine a conformity.

When the identification code in the stop-responding commands is consistent with the identification code of the tire pressure detectors 30, the second controller 32 enters the stop-responding mode. In the stop-responding mode, the second controller 32 does not send the responding message when receiving the activating command and waits for a step of receiving a code.

When the identification code in the stop-responding commands and the identification code of the tire pressure detectors 30 is not consistent, the second controller 32 discards the stop-responding command and waits for receiving the activating command again.

In practice, after the second controller 32 enters the stop-responding mode, the second controller 32 starts to time. When a predetermined time is up and the code is not received, the second controller 32 lifts the stop-responding mode to wait for receiving the activating command again, thereby preventing the second controller 32 from keeping staying in the stop-responding mode and could not be activated again in case the wireless programmer 10 could not send the code for some reason.

Step S16: The wireless programmer 10 sends the activating command again. In the current embodiment, the first controller 12 sends the activating command to all the tire pressure detectors 30 in a way of the broadcast via the first LF circuit 14a.

Step S17: After each of the tire pressure detectors 30, which does not stay in the stop-responding mode, receives the activating command, said tire pressure detector 30 sends the responding message. In the current embodiment, after the tire pressure detectors 30 receive the activating command, the second controller 32 of each of the tire pressure detectors 30 could determine whether the tire pressure detector 30 itself is in the stop-responding mode or not.

If yes, the tire pressure detector 30 does not send the responding message;

If not, the tire pressure detector 30 sends a responding message with the identification code of the tire pressure detector 30.

Step S18: The wireless programmer 10 receives the responding message and records the identification code in the responding message that is received. In the previous step S17, a number of the tire pressure detectors 30 sending the responding messages has been reduced. Therefore, in the step S18, the wireless signal interference between the responding messages could be avoided, so that the wireless programmer 10 could receive the responding messages of the tire pressure detectors 30 that is not in the stop-responding mode.

After that, the wireless programmer 10 could send the stop-responding command as mentioned in the step S14, the stop-responding command could merely include the identification codes recorded in the step S18 or could include the identification codes recorded in the step S13 and the step S18. When each of the tire pressure detectors 30 receives the at least one stop-responding command, each of the tire pressure detector 30 compares the identification code itself with the identification code or the identification codes of the at least one stop-responding command. When the identification code of the tire pressure detector 30 is consistent with the identification code of the stop-responding command, the tire pressure detector 30 enters the stop-responding mode. Similarly, when the second controller 32 does not receive the code within the predetermined time, the second controller 32 could lift the stop-responding.

In practice, the step S17 and the step S18 could be repeated to ensure the wireless programmer 10 receives all the identification codes of the tire pressure detectors 30.

Step S19: The wireless programmer 10 sends the code to each of the tire pressure detectors 30 having one of the identification codes recorded in the wireless programmer 10, so that the code could be saved in the tire pressure detectors 30.

More specifically, the first controller 12 of the wireless programmer 10 sends a preparing-program command within the predetermined time via the first LF circuit 14a. The preparing-program command includes the identification codes recorded in the first memory 16.

After the second LF circuit 34a of the tire pressure detector 30 receives the preparing-program command via the second LF circuit 34a, the preparing-program command is transmitted to the second controller 32. The second controller 32 compares the identification codes in the preparing-program command with the identification code of the second memory 36. When the identification codes are consistent, the second controller 32 enters a preparing-program mode to wait for receiving the code.

The wireless programmer 10 sends the code by broadcasting. After the tire pressure detectors 30 in the preparing-program mode receives the code, the code was programmed into the second memory 36, thereby completing a code programming.

After that, the code programming of each of the tire pressure detectors 30 is completed, a completing message sends to the wireless programmer 10 via the second LF circuit 34a. Each of the completing messages includes the identification code of one of the tire pressure detectors 30 and a state of program, wherein the state of program indicates whether the code program is successful or not. The first controller 12 of the wireless programmer 10 displays the identification codes and the states of program on the display unit 20.

In view of above, the wireless programming method of the current embodiment according to the present invention includes sending the activating commands many times via the wireless programmer, wherein before the wireless programmer sends the activating command again, the wireless programmer receives the responding messages of some of the tire pressure detectors and sends the at least one stop-responding to command is the some of the tire pressure detectors to enter the stop-responding mode, so that the number of the tire pressure detectors that could send the responding messages will be reduced after sending the activating command second time, thereby avoiding the wireless signal interference between the responding messages. With such design, the wireless programmer could receive all of the identification codes of the tire pressure detectors to ensure that the code could be programmed into all of the tire pressure detectors.

It must be pointed out that the embodiment described above is only a preferred embodiment of the present invention. All equivalent structures and methods which employ the concepts disclosed in this specification and the appended claims should fall within the scope of the present invention.

What is claimed is:

1. A wireless programming method for tire pressure detectors which is applied to a wireless programmer and a plurality of tire pressure detectors, wherein the wireless programmer communicates with the plurality of tire pressure detectors in a wireless way, and each of the plurality of tire pressure detectors has an identification code; the wireless programming method comprises:
(A) sending an activating command by the wireless programmer;
(B) sending a responding message by each of the plurality of tire pressure detectors which receives the activating command, wherein the plurality of responding messages respectively comprises the identification code of each of the plurality of tire pressure detectors;
(C) receiving at least one of the plurality of responding messages sent by the plurality of tire pressure detectors by the wireless programmer, and recording the identification code of the at least one of the plurality of responding messages that is received;
(D) sending at least one stop-responding command by the wireless programmer, wherein the at least one stop-responding command comprises the at least one identification code that is recorded;
(E) making at least one of the plurality of tire pressure detectors enter a stop-responding mode when the identification code of the tire pressure detector receiving the at least one stop-responding command is consistent with the identification code in the at least one stop-responding command, wherein at least one of the tire pressure detectors in the stop-responding mode stops sending the responding message when the at least one of the tire pressure detectors receives the activating command;
(F) sending the activating command again by the wireless programmer;
(G) receiving the activating command by the plurality of tire pressure detectors to make the tire pressure detectors, which do not stay in the stop-responding mode, send the responding messages;
(H) receiving the responding messages by the wireless programmer, and recording the identification code in each of the responding messages; and
(I) send a code by the wireless programmer to the plurality of tire pressure detectors having the identification codes that are recorded in the wireless programmer to program the code into the plurality of tire pressure detectors.

2. The wireless programming method as claimed in claim 1, wherein in the step C, the wireless programmer receives at least two of the plurality of responding messages sent by the plurality of tire pressure detectors; in the step D, the at least one stop-responding command sent by the wireless programmer comprises one stop-responding command, and the one stop-responding command comprises the at least two of the plurality of responding messages recorded in the wireless programmer.

3. The wireless programming method as claimed in claim 1, wherein in the step C, the wireless programmer receives at least two of the plurality of responding messages sent by the plurality of tire pressure detectors; in the step D, the at least one stop-responding command sent by the wireless programmer comprises at least two stop-responding commands, and each of the at least two stop-responding commands comprises one of the at least two of the plurality of responding messages recorded in the wireless programmer.

4. The wireless programming method as claimed in claim 1, wherein in the step E, the plurality of tire pressure detectors receives the at least one stop-responding command, and each of the plurality of tire pressure detectors compares the identification code in the at least one stop-responding command with the identification code of the tire pressure detector itself; when the identification code of the at least one stop-responding command is consistent with the identification code of the tire pressure detector itself, the tire pressure detector enters the stop-responding mode.

5. The wireless programming method as claimed in claim 1, wherein in the step G, the plurality of tire pressure detectors receives the activating command and determines that whether the tire pressure detector stays in the stop-responding mode; if yes, the tire pressure detector does not send the responding message; if no, the tire pressure detector sends a responding message with the identification code of the tire pressure detector itself.

6. The wireless programming method as claimed in claim 1, wherein in the step E, after the at least one of the plurality tire pressure detectors enters the stop-responding mode for a predetermined time and not receives the code, the stop-responding mode is lifted.

7. The wireless programming method as claimed in claim 1, further comprising a step between the step H and the step I: sending the at least one stop-responding command by the wireless programmer, wherein the at least one stop-responding command comprises the identification codes recorded in the wireless programmer in the step H; when the identification code of each of the plurality tire pressure detectors that receives the at least one stop-responding command is consistent with the identification code of the at least one stop-responding command, the tire pressure detector enters the stop-responding mode.

8. The wireless programming method as claimed in claim 1, wherein in the step I, the wireless programmer sends a preparing-program command, comprising the identification codes recorded in the wireless programmer, to command the plurality of tire pressure detectors having the identification codes that is consistent with the identification codes in the preparing-program command to enter a preparing-program mode; the wireless programmer sends the code by broadcasting; after the plurality of tire pressure detectors in the preparing-program mode receives the code, the tire pressure detectors program the code into a memory.

9. The wireless programming method as claimed in claim 8, further comprising a step J that sending a completing message to the wireless programmer, after each of the tire pressure detectors completely programs the code, wherein the completing message sent by each of the tire pressure detectors comprises the identification code and a state of program of the tire pressure detector; the wireless programmer displays the identification codes and the states of program on the display unit.

10. A wireless programming method for tire pressure detectors which is applied to a wireless programmer and a plurality of tire pressure detectors, wherein the wireless programmer communicates with the plurality of tire pressure detectors in a wireless way, and each of the plurality of tire pressure detectors has an identification code; the wireless programming method comprises:
(A) sending an activating command by the wireless programmer;
(B) sending a plurality of responding messages by the plurality of tire pressure detectors, after the plurality of tire pressure detectors receives the activating command, wherein the plurality of responding messages respectively comprises the identification code of at least one of the plurality of tire pressure detectors;
(C) receiving at least one of the plurality of responding messages sent by the plurality of tire pressure detectors by the wireless programmer, and recording the identification code of the at least one of the plurality of responding messages that is received;
(D) sending at least one stop-responding command by the wireless programmer, wherein the at least one stop-responding command comprises the at least one identification code that is recorded
(E) determining whether the identification code of the tire pressure detector itself is consistent with the identification code comprised in the at least one stop-responding command, after the tire pressure detector receives the at least one stop-responding command; when the identification codes are consistent, the at least one tire pressure detector enters a stop-responding mode;
(F) sending the activating command again by the wireless programmer;
(G) stopping sending the responding message by the at least one tire pressure detector which receives the activating command; and,
(H) sending a code by the wireless programmer to the at least one tire pressure detector having the identification code recorded in the wireless programmer, thereby programming the code into the at least one of the tire pressure detectors.

11. The wireless programming method as claimed in claim 10, wherein when the at least one of the plurality of tire pressure detectors stays in the stop-responding mode does not receive the code within a predetermined time, the stop-responding mode is lifted.

12. The wireless programming method as claimed in claim 11, wherein the wireless programmer performs the step H within the predetermined time.

* * * * *